Sept. 17, 1935.  G. F. TAYLOR  2,014,955
METHOD OF MAKING AN ABRASIVE TOOL
Filed May 6, 1933  2 Sheets-Sheet 1
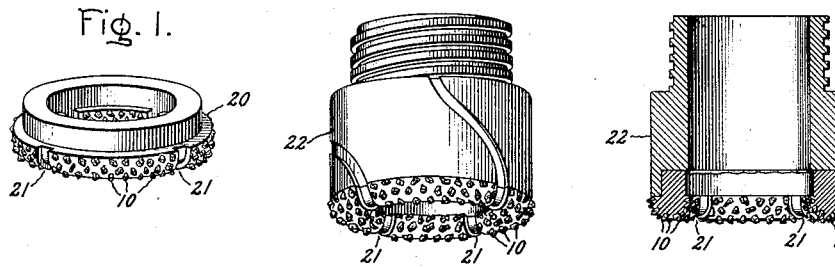
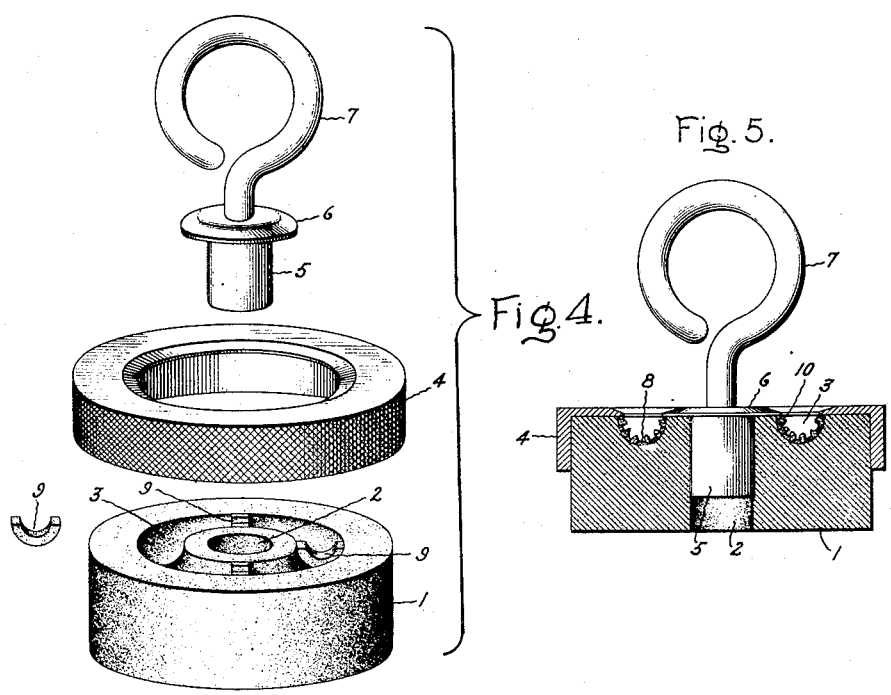
Inventor:
George F. Taylor,
by Chas. E. Tullar
His Attorney.

Sept. 17, 1935.  G. F. TAYLOR  2,014,955

METHOD OF MAKING AN ABRASIVE TOOL

Filed May 6, 1933   2 Sheets-Sheet 2

Inventor:
George F. Taylor;
by Charles E. Mullen
His Attorney.

Patented Sept. 17, 1935

2,014,955

UNITED STATES PATENT OFFICE 2,014,955

METHOD OF MAKING AN ABRASIVE TOOL

George F. Taylor, Schenectady, N. Y., assignor to General Electric Company, a corporation of New York Application May 6, 1933, Serial No. 669,742

6 Claims. (Cl. 76—108)

The present invention relates to a method of making abrasive tools and more particularly to a method of making diamond drills and the like.

In my prior copending application, Serial No. 357,536 filed April 23, 1929, I have disclosed a diamond drill in which the diamond particles are uniformly distributed through a sintered metallic binder capable of wetting the diamonds and forming an unusually strong bond therewith, while in my copending application, Serial No. 357,537, filed April 23, 1929, now Patent No. 1,941,283 I have disclosed a diamond core drill in which spaced diamonds are embedded in a sintered metallic binder material of the same character as that disclosed in application Serial No. 357,536.

Prior to the present invention, it has been difficult to produce a diamond drill in which spaced diamonds are embedded and securely held in position by a strong and relatively low-melting point matrix which is capable of wetting the diamonds at the sintering temperature of the matrix. It has also been difficult to produce a diamond drill in which each diamond in the drill extended substantially the same distance (designated the clearance) beyond a sintered matrix in which the diamonds are embedded. In the diamond drill disclosed in my prior application Serial No. 357,-537, a certain amount of clearance for the diamonds is obtained by removing portions of a graphite mold, placing diamonds therein, and then pressing and sintering a powdered metallic medium around the diamonds. However, such a process is undesirable since it is slow and inefficient and necessitates the employment of relatively large diamonds. It is an object of the present invention to overcome the above difficulties. A further object of the invention is to provide a simple and inexpensive method of fabricating a diamond drill. Other objects will appear hereinafter.

Figure 6:
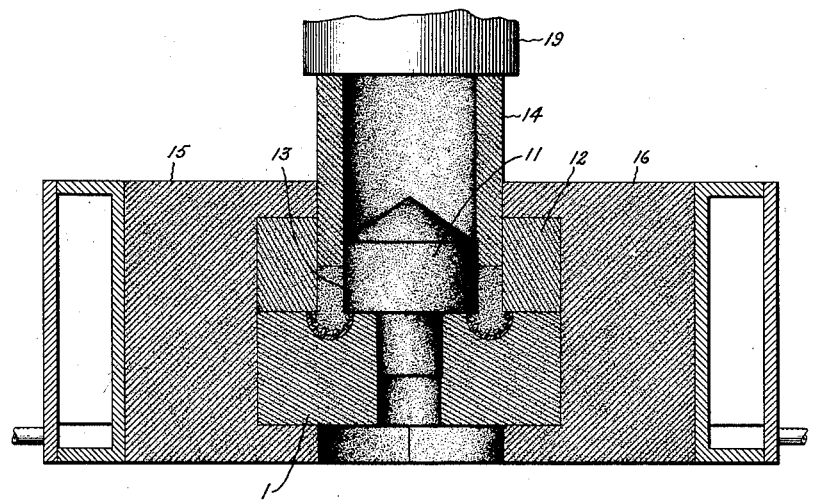
Figure 7:
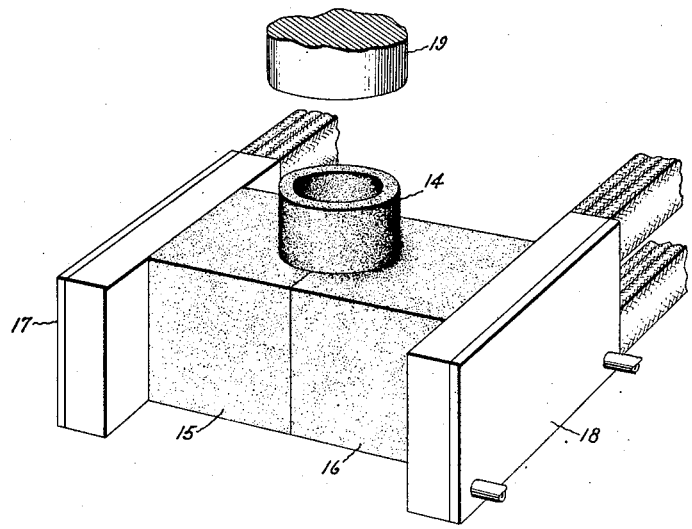

The novel features which are characteristic of my invention are set forth with particularity in the appended claims. The invention itself however will best be understood from reference to the following specification when considered in connection with the accompanying drawings in which Fig. 1 is a perspective view of the nose or cutting portion of a diamond core drill; Fig. 2 is a perspective view of the same drill brazed or welded to a steel holder or shank; Fig. 3 is a vertical cross section of the diamond drill disclosed in Fig. 2; Fig. 4 is an exploded view of a portion of the apparatus employed in applicant's process; Fig. 5 is a view partly in section and partly in elevation of the apparatus disclosed in Fig. 4 when assembled; Fig. 6 is a cross sectional view of apparatus employed in fabricating a diamond core drill according to the present invention; while Fig. 7 is a perspective view on a reduced scale of the apparatus disclosed in Fig. 6.

In carrying out my invention, I employ a graphite mold 1 provided with a central opening 2 and a groove 3 which may be semicircular in shape. A metal template comprising a ring 4 which fits closely on the mold 1 and has an inside diameter slightly less than the outside diameter of the groove 3 is placed on mold 1. A metal plug 5 having a flanged portion 6, the diameter of which is slightly greater than the inside diameter of groove 3, is positioned in the opening 2 of the mold. Plug 5 may be removed from the opening 2 by means of a handle 7.

A plastic mixture which may consist of a mixture of finely divided material such as graphite, abrasive particles such as carborundum, powdered starch and water is placed in groove 3 and spread over the groove to provide a layer 8 of substantially uniform depth throughout its entire extent. This plastic layer may be provided in various ways, for example by spraying, by pressing into the groove a form having substantially the same contour as the groove or by rotating in the groove a blade connected to the center of the mold. The blade may be guided by the track formed by ring 4 and flange 6. However, the most satisfactory method for applying the layer 8 consists in placing a sufficient quantity of paste in groove 3 and rotating mold 1 in a lathe while the paste is spread uniformly by means of a suitable forming tool mounted in the lathe tool post.

When the layer 8 has been prepared the ring 4 and plug 5 are removed from the mold and a plurality of spaced semicylindrical graphite members 9 are positioned in the groove 3 on top of the layer 8. These members have substantially the same curvature as groove 3 and serve the purpose of providing water channels in the nose of the finished drill.

The thickness of layer 8 is usually approximately one quarter of the thickness of the diamonds 10 employed in the drill. Diamonds 10, if large enough to be handled separately, are pushed into and through the layer 8 until they come into contact with the mold 1. This insures that the cutting point of each diamond will lie in the curved surface determined by the curvature of the groove 3 and no diamond will be above or below the zone of contact between the nose of the drill and the material being drilled. If desired, the diamonds may be positioned in groove 3 in a manner to act most efficiently when the diamond drill is intended for operation in one direction only.

When the diamonds employed are too small to be handled separately and positioned in the layer 8 with tweezers or the like they may be poured onto the plastic layer 8. In this case it is desirable that the layer 8 should be somewhat more plastic than that employed with larger diamonds. This more plastic layer permits the diamonds to adhere to the surface thereof and sink into it to an extent which will provide a suitable clearance for each diamond in the finished drill. After the diamonds have been poured into the groove 3 and onto layer 8 the mold I may be inverted to thereby remove those diamonds which are not in contact with the paste layer 8. By this means only a single layer of diamonds is employed and each diamond takes part in the cutting operation so that a tool of very high efficiency is secured.

After the diamonds have been positioned in the paste layer, a graphite block or plug II is placed in the opening 2 of the mold. The diameter of the upper portion of plug II is slightly greater than the inside diameter of groove 3, as clearly indicated in Fig. 6. A graphite ring 12 having an outside diameter substantially equal to the outside diameter of the mold I and an inside diameter slightly less than the outside diameter of groove 3 is positioned on mold I so as to provide an annular space 13 between the inner surface of the ring 12 and the upper portion of plug II. Powdered material which serves as the matrix material for the diamonds is now poured into the groove 3 so as to fill it completely and partially fill the annular space 13. A hollow cylindrical graphite plunger 14 is now inserted in the annular opening 13 and the assembled parts placed between a pair of carbon blocks 15 and 16 each provided with cooperating recessed semicylindrical surface portions adapted to accommodate and support the mold I and ring 8. The carbon blocks are also provided with cut away semicylindrical openings adapted to accommodate the graphite plunger 14, as indicated in Figs. 6 and 7. The carbon blocks 15 and 16 may be supported in any desired manner and held between water cooled copper electrodes 17 and 18 which are connected to a suitable source of electric energy, not shown.

When a circuit is completed through electrodes 17, 18 and carbon blocks 15 and 16, the powdered material in the mold is heated to its sintering temperature and pressure is simultaneously applied to the powdered material by means of the plunger 19 thereby forcing the sintered material around those portions of the diamonds 10 which project above the layer 8. Layer 8, prior to the application of heat, is in a plastic condition but after the application of heat it is converted into a plaster-like mass which may be easily removed with a steel brush or the like.

After the sintering and pressing operation the drill nose has the form indicated at 20 in Fig. 1 of the drawing. The grooves 21 clearly indicated in this figure are caused by the presence of the semicylindrical graphite members 9 in the mold. These grooves permit a flow of water from the inside to the outside of the drill during the drilling operation. The drill nose may be secured to a steel shank 22 as indicated in Figs. 2 and 3 in any suitable manner such as copper brazing or welding.

The plastic layer 8 serves two purposes, first, it holds the diamonds in position until the pressing and sintering operations are completed and, second, it occupies the space between the powdered material and the base of the groove 3 and thereby prevents the diamonds from being completely surrounded by metal during the pressing and sintering operation.

The layer 8 may be composed of various materials. If a very small clearance is desired in the finished drill a very thin plastic layer cannot be employed to advantage for the reason that if layer 8 is very thin it might not be possible to hold the diamonds in position in it. In such an event the plastic layer 8 may consist substantially of powdered metal mixed with starch paste or the like and may have any thickness necessary to hold the diamonds in position. The diamonds may be positioned in such a plastic layer and the drill fabricated as hereinbefore set forth. When the drill is completed the end portion of it may be sand blasted to thereby remove a portion of the sintered metal and expose the diamonds to a desired extent. The metal employed to produce the plastic layer may be the same metal as that employed to be pressed and sintered around the upper portions of the diamonds.

While I have illustrated my invention in connection with a diamond drill, it is obvious that other abrasives than diamonds may be employed if desired. When diamonds are employed as the abrasive material, I prefer to employ black diamonds although clear bortz may be employed if desired.

Different metal compositions may be employed as the sintered matrix or holder for the diamond particles. I prefer to employ a sintered composition consisting of tungsten carbide and cobalt, the cobalt comprising from a few per cent up to 20% of the composition. Such compositions are known broadly as cemented carbides and the above composition of tungsten carbide and cobalt is known as cemented tungsten carbide. Cemented tungsten carbide has a great advantage when used as a matrix for diamonds since at its sintering temperature it will wet the diamond particles and form a very strong adhesive bond with them. Cemented tungsten carbide also has substantially the same coefficient of expansion as the diamonds and therefore does not cause excessive pressure and strain on the diamonds with changing temperatures. The sintering temperature employed with cemented tungsten carbide, while in the neightborhood of 1300° C., is below the temperature at which the diamonds may be graphitized or in any way adversely affected.

If desired, I may employ as the matrix for the diamonds, metal compositions known as Stellite and consisting of about 13.2% to 36% chromium, 34.5% to 75% cobalt and 5% to 40% of metal from a group consisting of tungsten and molybdenum. Such compositions when heated to their sintering temperature likewise have the property of wetting diamonds. Metal compositions of this character are strong and have a far lower sintering temperature than cemented carbides and therefore are less likely to graphitize or injure the diamonds during the sintering operation. There is also an economy in employing a relatively low sintering temperature. On the other hand, cemented tungsten carbide provides a matrix for the diamonds which has substantially the same coefficient of expansion as the diamonds and is far harder and as strong, or stronger, than Stellite or other alloy binder materials.

Drills made according to the present process have the advantage that the diamonds may be embedded in the matrix to any desired extent. They also have the advantage that each diamond has substantially the same clearance, i. e. each extends the same distance beyond the matrix so that all diamonds are active simultaneously, thereby providing the greatest possible number of cutting edges and the greatest possible efficiency in the operation of the drill.

What I claim as new and desire to secure by Letters Patent of the United States, is:

1. The method of making an abrasive tool which comprises placing a layer of plastic material in a refractory mold, positioning abrasive particles in said plastic layer and pressing finely divided metal onto said abrasive particles and layer while said metal is simultaneously heated to its sintering temperature.

2. The method of making an abrasive tool which comprises placing a layer of plastic material in a refractory mold, positioning diamonds in said plastic layer so that the diamonds are in contact with said mold and the upper portions of said diamonds are exposed and pressing onto said diamonds and plastic layer finely divided metal while said metal is heated to its sintering temperature, said metal having the property of wetting the diamonds at its sintering temperature and forming a strong adhesive bond with said diamonds when cooled from said sintering temperature.

3. The method of making a diamond drill which comprises placing a layer of plastic material of substantially uniform depth in a carbon mold, said layer consisting substantially of a mixture of carbon, abrasive material and starch paste, positioning diamonds in said layer and pressing onto said diamonds finely divided metal while said metal is heated to its sintering temperature.

4. The method of making a diamond drill which comprises placing a layer of plastic material of substantially uniform depth in a carbon mold, said layer consisting substantially of a mixture of abrasive particles and starch paste, positioning diamonds in said layer and pressing a mixture of finely divided metal consisting substantially of tungsten carbide and cobalt onto said diamonds while said metal is heated to its sintering temperature, said finely divided metal containing from about 3% to about 20% cobalt.

5. The method of making a diamond drill which comprises placing a layer of plastic material having a substantially uniform depth in a refractory mold, said layer consisting substantially of carbon, abrasive particles and starch paste, positioning diamonds in said layer and pressing onto said diamonds a mixture of finely divided material consisting substantially of about 34% to 75% cobalt, about 13% to about 36% chromium and about 5% to 40% metal from a group consisting of tungsten and molybdenum while said material is heated to its sintering temperature.

6. The method of making an abrasive tool which comprises placing a layer of plastic material of substantially uniform depth in a refractory mold, said layer consisting of a mixture of starch paste and finely divided metal, positioning diamonds in said plastic layer and pressing a further quantity of said finely divided metal onto said abrasive particles while said finely divided metal is heated to its sintering temperature, said finely divided metal consisting substantially of 34% to 75% cobalt, about 13% to 36% chromium and about 5% to 40% of metal from a group consisting of tungsten and molybdenum.

GEORGE F. TAYLOR.